United States Patent
Bradd et al.

(10) Patent No.: US 7,408,928 B2
(45) Date of Patent: Aug. 5, 2008

(54) METHODS AND APPARATUS FOR SETTING UP TELEPHONY CONNECTIONS BETWEEN TWO ADDRESS DOMAINS HAVING OVERLAPPING ADDRESS RANGES

(75) Inventors: Patrick Bradd, Maidenhead (GB); Kevin J. Baughan, Maidenhead (GB); Cedric Aoun, Billancourt (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 1137 days.

(21) Appl. No.: 10/032,414

(22) Filed: Dec. 21, 2001

(65) Prior Publication Data

US 2003/0118002 A1 Jun. 26, 2003

(51) Int. Cl.
*H04L 12/28* (2006.01)
(52) U.S. Cl. ........................ 370/389; 370/401
(58) Field of Classification Search ................ 370/338, 370/351, 352, 353, 382, 383, 389, 395.52, 370/395.54, 400, 401, 409, 465, 474, 392, 370/466; 709/225, 227, 228, 229, 238, 245
See application file for complete search history.

(56) References Cited

U.S. PATENT DOCUMENTS

| 6,493,765 | B1 * | 12/2002 | Cunningham et al. ....... 709/245 |
|---|---|---|---|
| 6,614,781 | B1 * | 9/2003 | Elliott et al. ................. 370/352 |
| 6,724,747 | B1 * | 4/2004 | Arango et al. ............... 370/352 |
| 6,731,642 | B1 * | 5/2004 | Borella et al. ............... 370/401 |
| 7,085,267 | B2 * | 8/2006 | Carey et al. .................. 370/389 |
| 7,246,166 | B1 * | 7/2007 | Watson ........................ 709/227 |
| 2002/0152325 | A1 * | 10/2002 | Elgebaly et al. ............. 709/246 |
| 2003/0009561 | A1 * | 1/2003 | Sollee ......................... 709/227 |
| 2004/0037268 | A1 * | 2/2004 | Read ........................... 370/352 |
| 2004/0252683 | A1 * | 12/2004 | Kennedy et al. ............. 370/389 |

\* cited by examiner

*Primary Examiner*—Huy D. Vu
*Assistant Examiner*—Christine Ng
(74) *Attorney, Agent, or Firm*—Trop, Pruner & Hu, P.C.

(57) ABSTRACT

IP addresses are presently becoming a scarce resource, even in private IP address domains. Commonly therefore network address translators are used to map a large number of private addresses to a relatively small number of public IP address, or even map addresses between two different IP address domains. However, network address translators do not readily pass voice set-up protocols such as SIP and VoIP packets. By modifying a call server and providing an intelligent network address translator, conventional media gateways may be caused to use the intelligent address translator to route VoIP packets between IP domains having overlapping address spaces.

11 Claims, 7 Drawing Sheets

Figure 7

METHODS AND APPARATUS FOR SETTING UP TELEPHONY CONNECTIONS BETWEEN TWO ADDRESS DOMAINS HAVING OVERLAPPING ADDRESS RANGES

FIELD OF THE INVENTION

This invention relates to a method of initiating a voice-over-IP (VoIP) call to a call server for setting up VoIP calls to an address translator and to a packet-switched network.

BACKGROUND OF THE INVENTION

In a packet-switched network (such as an Internet protocol [IP]-based network) each data destination and data source has a uniquely identifiable address. These are referred to as IP hosts. In the case of IP networks, the Internet Assigned Numbers Authority (IANA) receives requests to assign blocks of IP addresses for public IP addresses. Organizations that receive these blocks of IP addresses from IANA are then free to assign these addresses to any IP host that they control as they see fit. IANA is not concerned about the allocation of IP addresses in private IP networks: i.e. those networks that have IP addresses that start with 10. (i.e. 10/8 IP address space) are examples of this as discussed below. As a result of limited address space, even in private IP address domains, a single IP address domain is not able to handle all the IP hosts required to provide telephony services to scale to the size of networks required by new VoIP telephony operators.

A new version of the Internal protocol (IPv6) is presently being defined which will have a much larger address space than the present IPv4 specification. However, even when this standard is finally released, it will be necessary to replace or update all the components forming part of a network to take full advantage of the increase in address space. Thus, presently, IPv6 cannot be readily used to overcome IP address scarcity.

In the mid 1990s, the IANA recognised that IP addresses would eventually run out and accordingly reserved three contiguous blocks of private addresses commonly referred to as the 10/8, 172.16/12 and 192.168/16 address blocks. The largest of these blocks (the 10/8 block) provides approximately 16 million unique IP addresses. Thus with appropriate (and well known) routing techniques, it is possible to have a private network (private in the sense that it does not have publicly addressable/Internet addressable IP addresses for all network nodes) may be constructed having up to 16 million unique nodes. Data required to be routed outside the network may then only need to use a relatively small number of unique public IP addresses, In this way, devices not needing public access (RFC 1918 provides the example of an airport departure lounge having IP addressable status indicator boards in which the status indicator boards do not need to be uniquely addressable from outside the airport lounge) may be constructed without using the scarce public IP address resource.

In order to allow communication using the IP addresses between public and private networks, a technique called network address translation (NAT) has been developed. In its most sophisticated form, this typically provides a gateway router at the boundary of the private network which dynamically assigns mappings between a port on a public IP address and a port on the IP address of a private network node within the private network. Thus for example, if the private network has a web browser, typically the web browser will issue a request on port 80 of its private IP address which may then be mapped within the NAT router to any port (let us say 5000 for the sake of this example) on the public IP address of the NAT router. The NAT router then forwards the request to the web server having replaced the private IP address at port 80 with the NAT router's public IP address at port 5000. When the data is returned by the web server to port 5000 of the NAT router, the NAT router alters the IP headers to replace the NAT routers public IP address at port 5000 with the originating private IP address at port 80. Thus the browser on the private terminal simply sees data being returned to it on port 80 and does not see any of the address and port translation adjustments carried out by the NAT router.

As explained below in detail, NAT routing works for many applications. However, as is well understood in the prior art, NAT routing of this type is not possible for protocols such as session initiation protocol (SIP), H.248, MGCP or H.323 which are used for multi-media transmissions and in particular for voice over IP (VoIP) transmissions. There are several reasons for this but the most common problem results from the need for these protocols to carry IP address information within the IP packet payload. Thus changes made by the NAT router to the IP header do not correctly readdress the packet since addressing information is also contained in the payload of the packet. Furthermore, dynamic binding of private and public addresses and ports and port ranges as often carried out NAT routers, may result in port mappings being "expired" while a media session is in progress. If this occurs, the connection will be lost since at least some of the terminals in the session will no longer be able to address other terminals in the session, Although some NAT routers provide static bindings to overcome this problem, this is not readily scalable.

Thus it is well understood in the art that NAT routing is unsuitable for use with applications requiring a media session exchange and signalling exchange, such as VOIP connections.

Therefore, VoIP connections presently need to be made over networks having unique IP addresses for all nodes. Thus connections may readily be made over the Internet (which by definition has unique IP addresses for all nodes considered to be a part of the public internet) or over private networks which do not have duplicate addresses and occasionally between private and public networks using dedicated media gateway translators at the network edges which requires an undesirable conversion between VoIP and VoTDM since the inter-network traffic is carried on traditional time-division multiplex (TDM) trunks. However, as noted above, the largest private address space provides approximately 16 million unique IP addresses. In a typical present day cable telephony provision, each household requires typically four IP addresses. For example, a household provisioned according to the "packetcable" standard will have two IP addresses assigned to the modem terminal adaptor (media gateway); namely one for the media gateway and the other for a cable modem, one IP address assigned to a set top box and at least one IP address assigned to a personal computer. Thus taking present day real figures, it is reasonable to assume that a cable operators region has eight million households "passed" by its cable service. Assuming that the cable service has a 25% penetration rate, that means that two million homes will have cable provision which will use four million IP addresses. Thus the largest private address range (the 10/8 range) can only supply enough IP addresses for two regions of the cable operator.

Therefore, if the cable operator wishes to provide telephony services over its IP network, it must be able to reuse the private block address space unless it has a very low number of subscribers. This will therefore generate duplicate addresses and will prevent VoIP calls being routed correctly since an originating terminal will not be able to have its call routed correctly since it will not be possible to determine which of the plurality of destination terminals is the correct destination terminal. As a result, VoIP calls will not be able to work between regions, and the operator will need to have VoIP to TDM gateways on the edge of this domain, and then have TDM trunks between the region. This adds extra costs to the deployment, and also has an adverse affect on the voice quality due to more conversions between VoIP and VoTDM.

SUMMARY OF THE INVENTION

In accordance with a first aspect of the invention there is provided a method of initiating a VoIP call comprising issuing a call set-up request at a first terminal having an address in a first address range, the call set-up request being destined for a second terminal in a separate network having an address in a second address range which overlaps with the first address range, passing the call set-up request to a first call server communicatively coupled to the first address range, passing the call set-up request from the first call server to a second call server communicatively coupled to the second address range, causing the call servers to negotiate a port at each respective addresses of the terminals for subsequent communication once the call is set-up, providing a first address translator having a first range address in the first address range, providing a second address translator having a second range address in the second address range, causing the first call server to provide the first terminal with the first range address of the first address translator as its destination address for the call, causing the second call server to provide the second terminal with the second range address of the second address translator as its destination address for the call, arranging for the first address translator to pass data received at the first range address from the first terminal at the negotiated port to the second address translator for onward communication to the address of the second terminal at the negotiated port, and arranging for the second address translator to pass data received at the second range address from the second terminal at the negotiated port to the first address translator for onward communication to the address of the first terminal at the negotiated port, whereby two-way communication is established between the first and second terminals via the first and second address translators.

In this way, the originating and the destination terminals interact with a call server in an entirely conventional way. The call server uses an intelligent address translator to carry out routing of the data to the second network having the overlapping address range. A combination of the call server and the address translators overcomes the problem of duplicate addresses and overcomes the problems with prior art NAT routers.

The address translator may be a single device having addresses in the first and second address ranges. Alteratively, (and in particular in order to scale the routing to more than two overlapping address ranges) at least one address translator may be provided for each address range. Each such address translator has an address within the address range and an address in a third range shared or common amongst the address translators. Thus each of the address translators can communicate using the third address range network and thus data may be routed from one terminal to a terminal in any of the other networks via the appropriate pair of address translators.

In a second aspect, the invention provides a call server for setting up VoIP calls over a packet-switched network comprising a terminal controller arranged to receive a call set-up request from an originating terminal, an address translator controller arranged to provide to an address translator, the IP address of the originating terminal as derived from a call set-up request received by the terminal controller.

In a further aspect, the invention provides an address translator comprising a terminal port for communicating with a terminal, a translator port for communicating with another address translator, and a control port for communicating with a call server. Furthermore, a packet-switched network in accordance with the invention has a call server, a terminal and an address translator, the call server being arranged to control the address translator and to generate a mapping in the address translator between the address of the terminal in the said first network and the address of another network address translator outside the first network, the address translator being arranged to communicate with the other address translator to allow communication with another terminal in another network having an IP address range which overlaps with that of the first network.

It will be appreciated that in the context of this invention, the term 'terminal' is used to encompass any source of a media session such as a media gateway or a media proxy.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

FIG. 7 is a schematic block diagram of a network having a plurality of call servers, to overlapping address ranges and a plurality of media gateways.

DETAILED DESCRIPTION OF THE INVENTION

Figure 1:
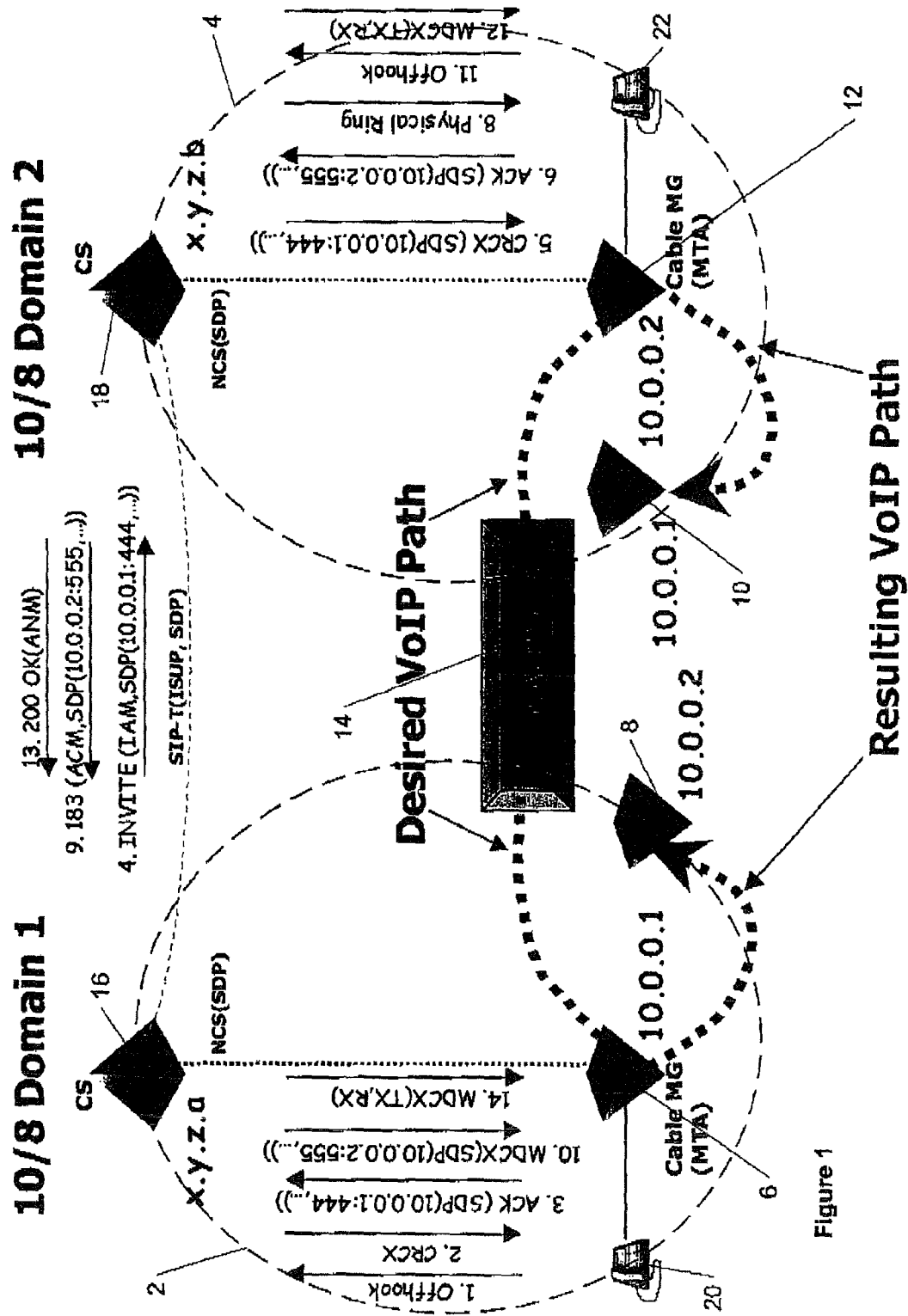
FIG. 1 shows a prior art arrangement of two overlapping private domains and an unsuccessful attempt to use NAT routing between the domains.

With reference to FIG. 1, a first network 2 has a first IP address range based on the 10/8 private address block and a second network 4 has a second address range based on the same 10/8 private IP address range.

The first network 2 has media gateways 6 and 8 which (in this example) have respective IP addresses 10.0.0.1 and 10.0.0.2. Similarly, the second network 4 has media gateways 10 and 12 which also have respective IP addresses 10.0.0.1 and 10.0.0.2.

The call servers typically are in the same address space. They should be able to communicate with one another (typically via this common address space) the call servers also need to be reachable from the media gateways within their respective associated networks 2 and 4.

A network address port translator 14 (NAPT) inter-connects the two networks.

The networks also include respective call servers 16 and 18 which are used to set up calls (using the SIP telephony protocol) carrying some ISUP variant and session descriptor protocol (SOP) information. The call servers 16 and 18 are in the same address space and have respective exemplary IP addresses x.y.z.a. and x.y.z.b.

The diagram shows simplified flow control between the media gateway. Briefly, media gateway 6 wishes to initiate a VoIP call with media gateway 12 to provide a telephony connection between telephone terminal 20 (connected to media gateway 6) and telephone terminal 22 (connected to media gateway 12).

Accordingly, media gateway 6 communicates with call server 16 and indicates that it wishes to set up a call on port 444 at its own IP address of 10.0.0.1. As is well known, the precise details of the call set up and the available media streams will be defined using the session descriptor protocol (SDP) and will be carried in the messages passed via the call server. The call server 16 passes the various requests and acknowledgements to call server 18 which knows that the call is destined for media gateway 12 based on the digits of the called party number located in the inter-call server communication (most likely a SIP-T message). Media gateway 12 indicates that it is prepared to accept the call and indicates that communication should be carried out on UDP port 555 at its own IP address 10.0.0.2. In due course, the call is set up and each of the media gateways 6 and 12 has the address and port of the media gateway at the other end of the call and data packets begin to flow between the media gateways on the port and IP address specified.

However, at this point the problem briefly discussed above, occurs. Media gateway 6 has been given an IP address of 10.0.0.2 for the terminating media gateway 12. However, media gateway 6 can "see" an alternative 10.0.0.2 addressed media gateway namely media gateway 8. Media gateway 6 has no way of knowing whether it should route information to the media gateway 8 within its own Internal network or whether it should route data to the network address translator 14 for onward routing to another network. In practice, the network 2 will simply route data destined for 10.0.0.2 to the media gateway 8. Media gateway 8 is not expecting a call, has not been involved in the protocol messages which have flowed between the call server 16 and 18 cannot therefore communicate with media gateway 6 in the way which is expected by media gateway 6. Similarly, and for the same reasons, media gateway 12 directs its return flow to media gateway 10 instead of media gateway 6.

Thus, call set-up has failed completely and NAT 14 is not involved in the data flow at all. Thus this prior art scenario fails.

Figure 2:
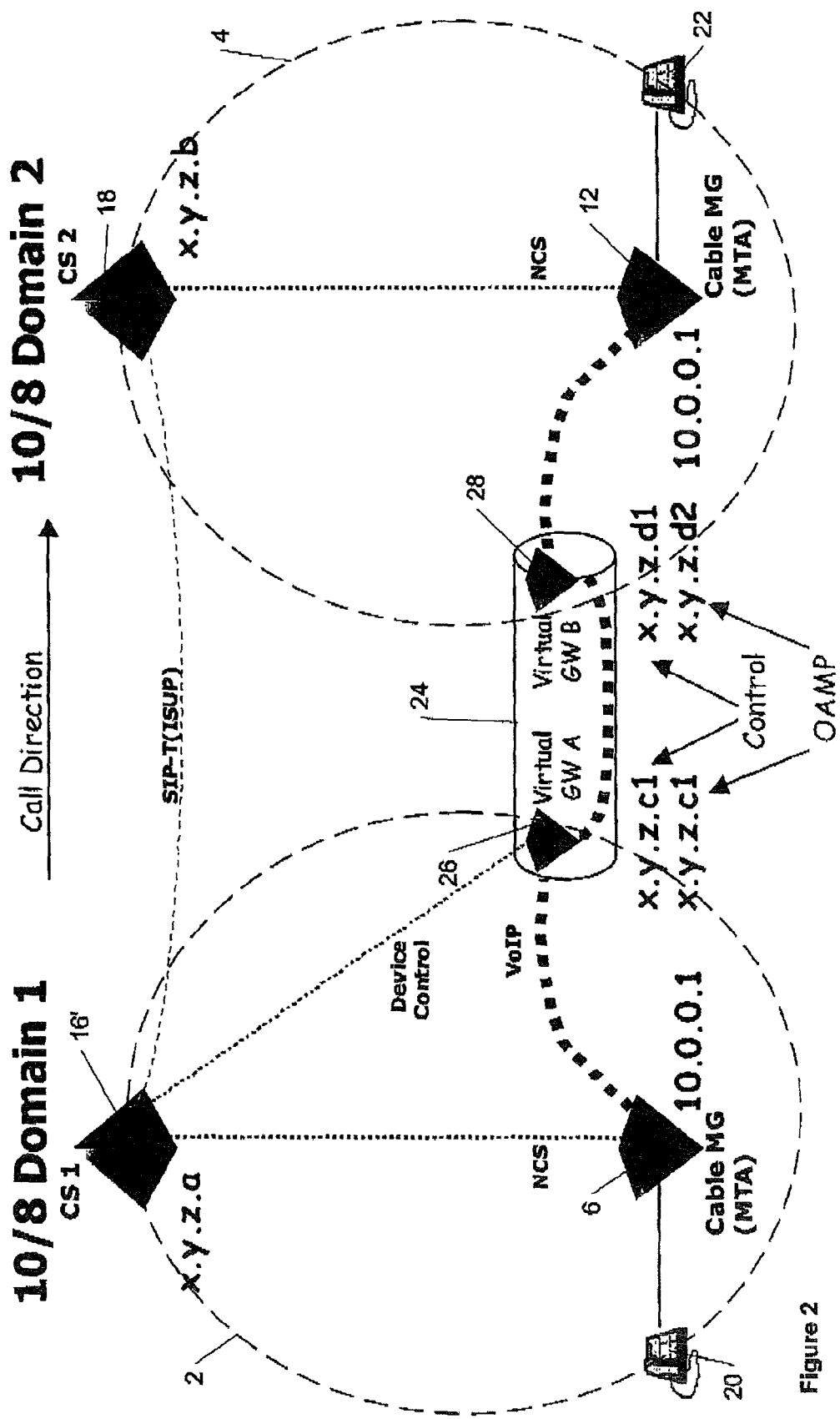
FIG. 2 is an example of a first preferred embodiment using a single address translator between two overlapping domains.

FIG. 2 shows a simplified arrangement in accordance with the invention. As before, two networks 2 and 4 have overlapping private address spaces and each network has a call server 16' and 18. A media gateway 6 in network 2 and a media gateway 12 in network 4 have identical (10.0.0.1) IP addresses. An address translator 24 (which is provided with new functionality as described below) has two network interfaces (one for each network 2 and 4) having respective IP addresses in each of the networks 2 and 4. The IP addresses of the call server 16' and 18 are in a common address space so that the call servers are able to address one another and they are also able to communicate with media gateways in network or networks for which they are 'responsible'.

Figure 3:
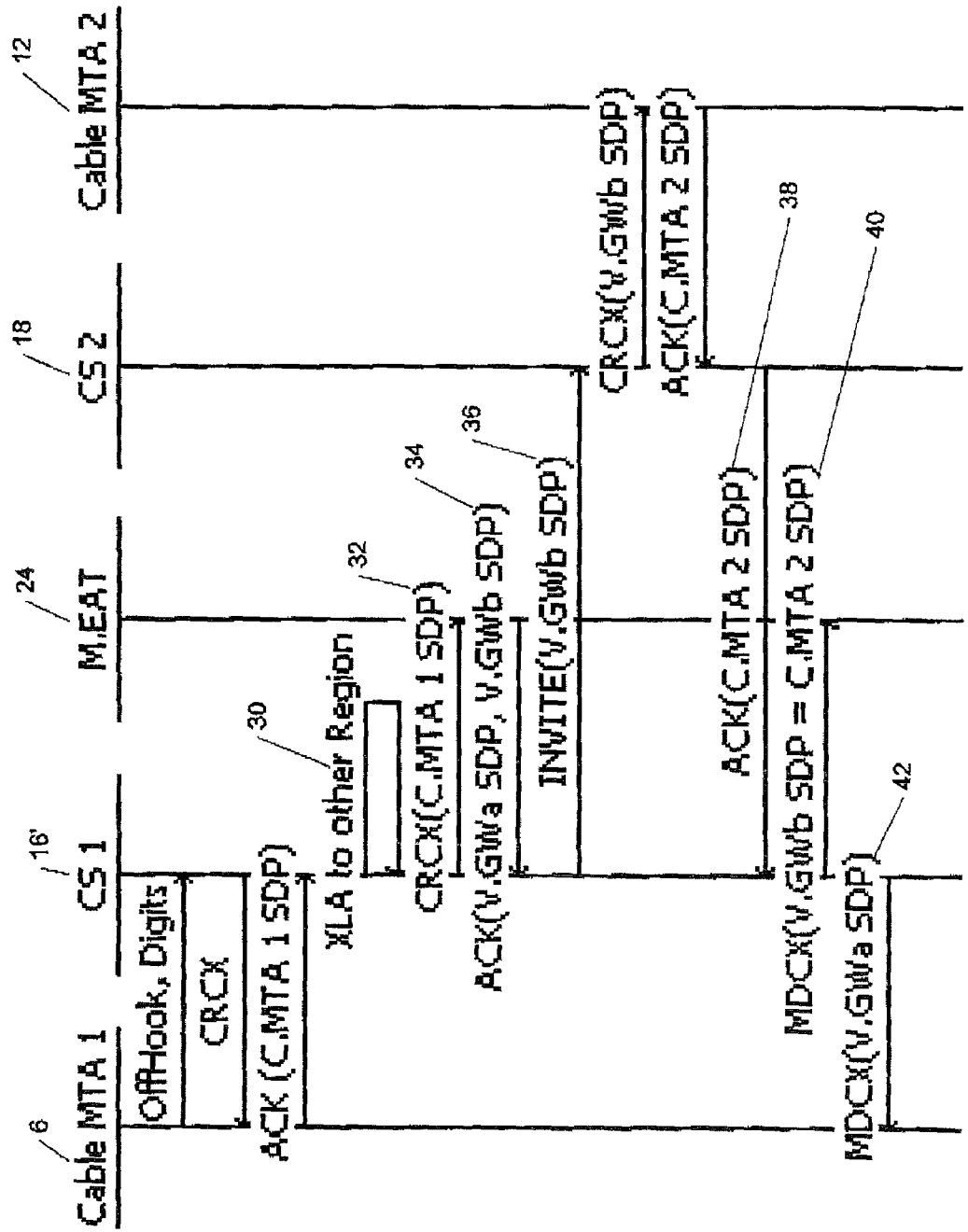
FIG. 3 is a schematic diagram showing SIP protocol messaging between the call servers, device control protocols between the call servers and media gateways and device control protocols between the call server and address translator of FIG. 2.

With reference also to FIG. 3, brief call flow information is shown. In summary, media gateway 6 begins to initiate call set-up via call server 16'. This is communicated to call server 18 and is also communicated to the address translator 24. Call server 16' arranges for media gateway 6 to have its destination address as the address of a virtual gateway 26 and similarly call server 16' causes call server 18 to assign a destination address of a virtual gateway 28 to the media gateway 12. Thus by providing the address translator 24 and a modified call server 16', the media gateways are caused to route data in the correct way. The address translator 24 is able to modify addresses in the IP packets it receives (both in the payload and header depending on protocol used) so that media gateway 6 views virtual gateway 26 as its destination terminal and media gateway 12 similarly, views virtual gateway 28 as its destination terminal. Data is routed through the translator between the virtual gateways 26 and 28 so that a path is established between the two media gateways 6 and 12 having identical IP addresses (albeit on separate networks).

Considering FIG. 3 in detail, after the initial call set-up exchanges between the gateway 6 and the call server 16', the call server 16' (in protocol exchange 30) determines, based on translations, that the call must go out on a SIP-T route. The particular SIP-T route is provisioned to indicate that the call goes through the address translator 24. In protocol exchange 32, the call server 16' tells the address translator 24 about the SDP information for media gateway 6.

In protocol exchange 34, the address translator 24 tells the call server 16' about two SDPs instead of one; namely the SDP information for virtual gateway 26. It also tells call server 16' about the SDP information for virtual gateway 28 which will need to be passed to call server 18 via SIP-T.

In protocol exchange 36, call server 16' carries out the usual SIP-T invite exchange but using the SOP information for virtual gateway 28.

In protocol exchange 38, call server 18 provides call server 16' with SDP information for the gateway 12.

In protocol exchange 40, call server 16' then (knowing that the call will be routed via the address translator 24), tells the address translator 24 about the correct mapping to make between virtual gateway 28 and the media gateway 12. Finally, in protocol exchange 42, gateway 6 is instructed to send real time protocol (RTP) packets to the address translator 24. It will be noted, that the address translator 24 is configured automatically to allocate a UDP port for real time control protocol (RTCP) which is equal to the RTP UDP port (typically an even number) plus 1. This is carried out automatically without call server intervention.

Data then flows between the gateways 6 and 12 (via address translator 24) in the conventional manner.

Figure 4:
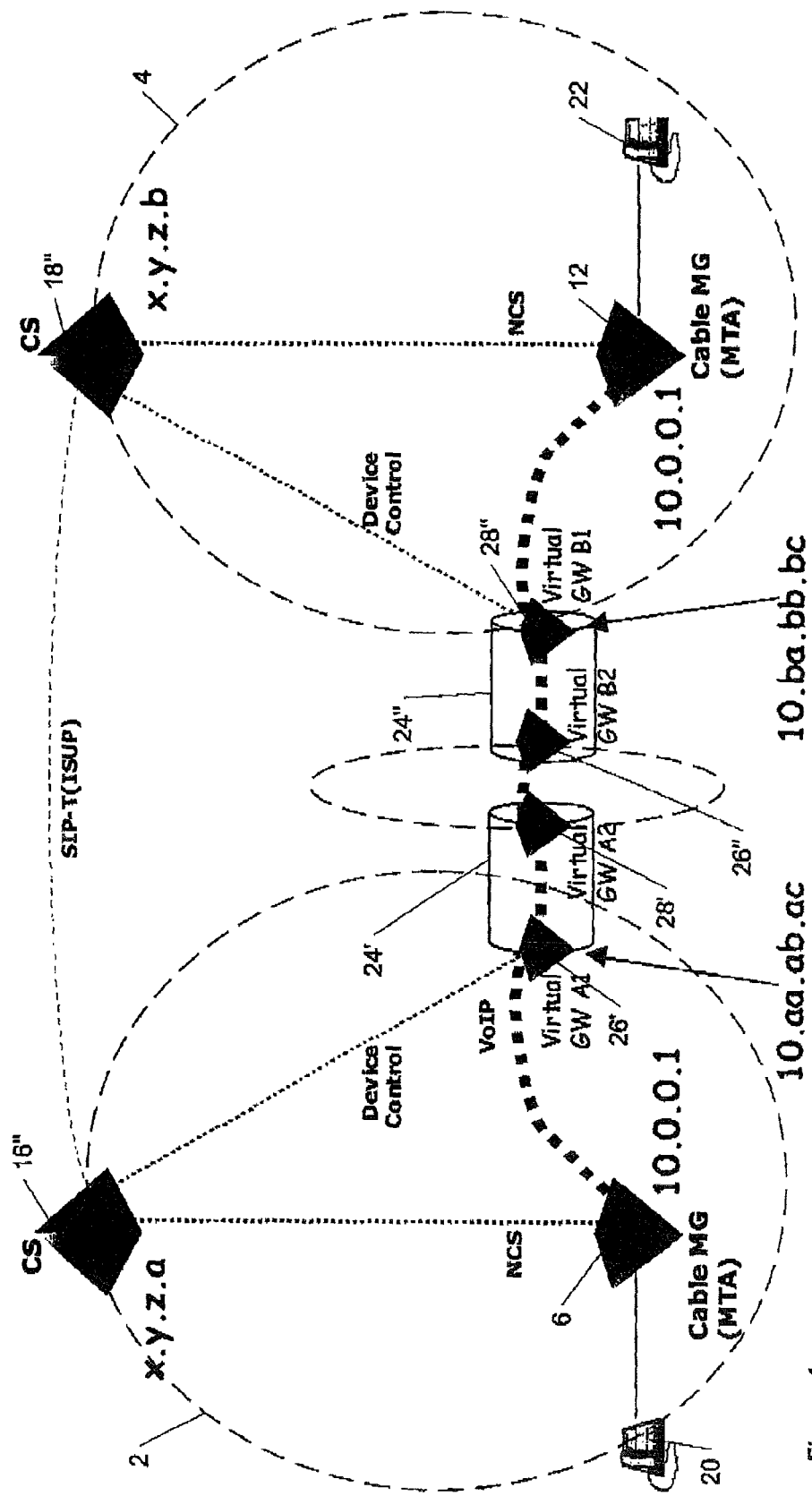
FIG. 4 is a schematic block diagram of a second preferred embodiment of the invention showing scalability to more than two domains of overlapping IP addresses.
Figure 6:
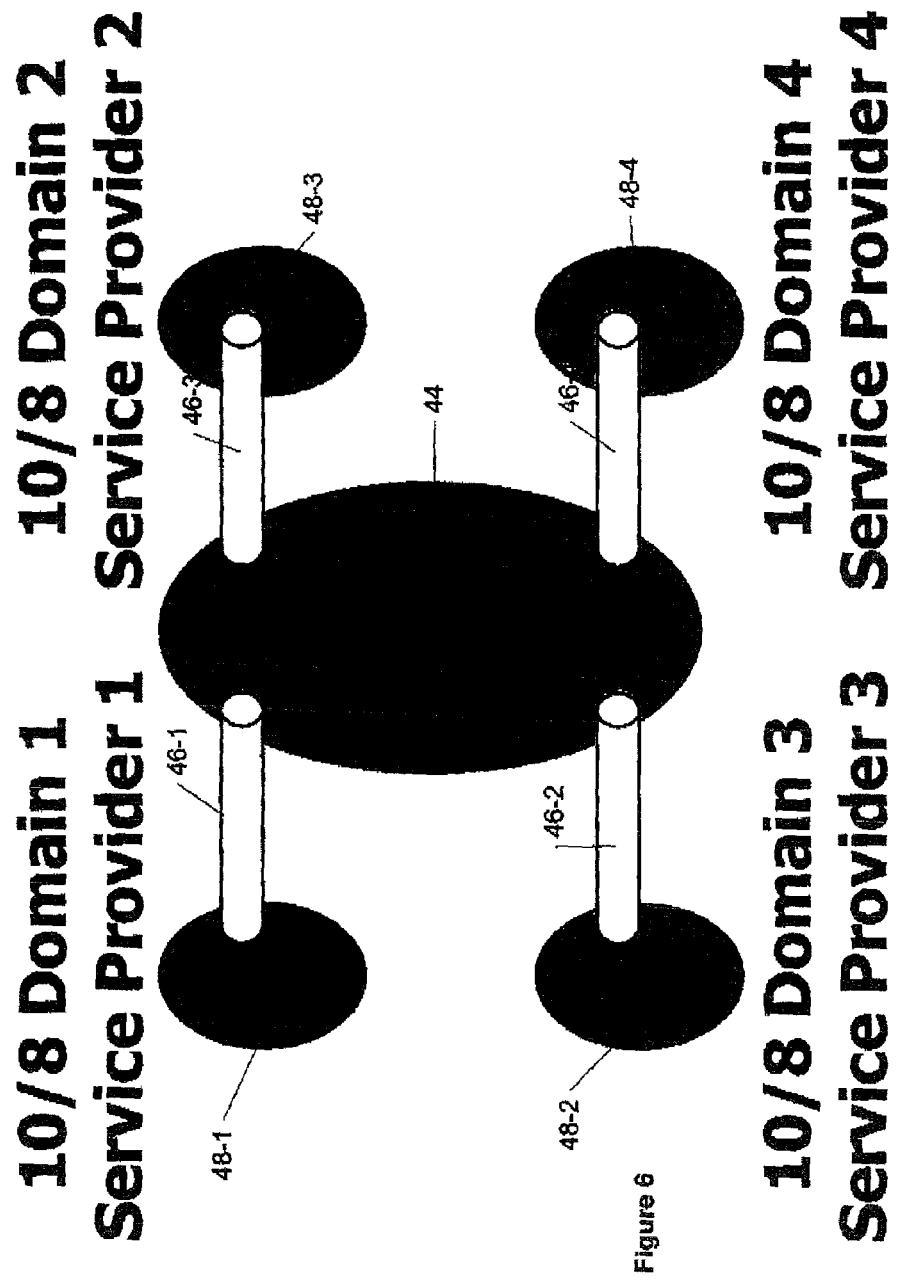
FIG. 6 is a schematic block diagram showing the use of a plurality of address translators for networks having overlapping IP addresses.

FIG. 4 shows an alternative scenario in which the address translator 24 of FIG. 2 has been replaced with a pair of address translators 24' and 24" which share a common address space 44. This may be the same address space as that used by the call servers. The purpose for this will be seen with reference to FIG. 6 in which address translators 46-1, 46-2, 46-3 and 46-4 are each provided addresses in a common address space 44 in order to interconnect four separate domains having overlapping 10/8 address blocks (48-1 to 48-4).

This arrangement means that each service provider may be different for each region 48-1 to 48-4. Each service provider need only provide its own address translator. This simplifies the business model for this arrangement and as will be explained below in connection with FIGS. 4 and 5, allows the technical model to be readily scalable. This is because each new overlapping address space which needs to be communicated with, need only provide an address translated connection into the common address space (in addition to the call servers being in a common address space as has always been the case). Thus the networks may be connected in a so-called "star topology".

Figure 5:
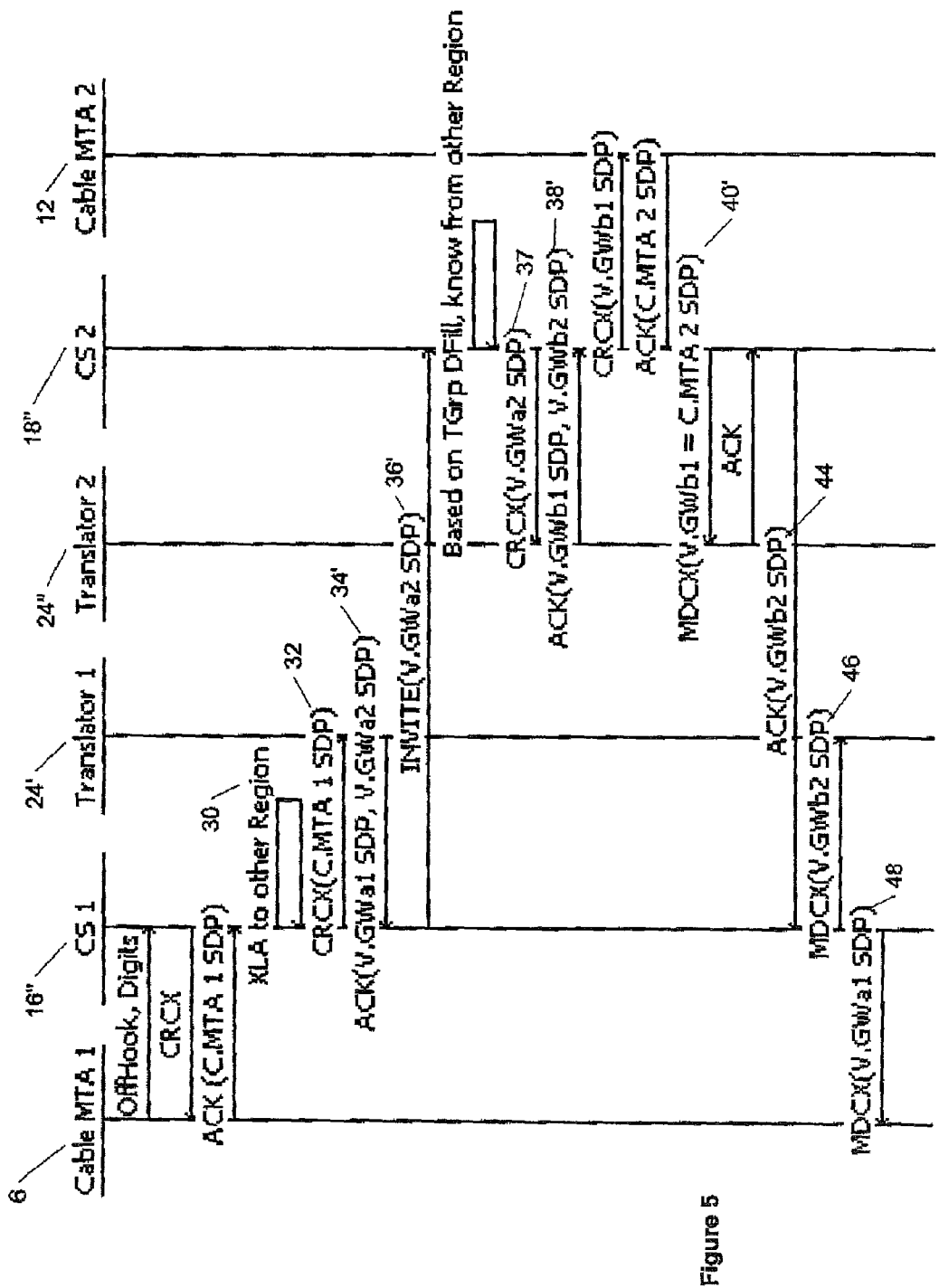
FIG. 5 is a schematic diagram showing message sequences for the arrangement of FIG. 4.

With reference therefore to FIGS. 4 and 5, with the exception of the duplicated address translators and minor modifications to the call servers (now numbered 16" and 18") the remainder of the network is the same as that shown in FIG. 2. In summary, the general idea is that a call server 16" associated with network 2 deals with the control for its own address translator 24' and a modified call server 18" (associated with network 4) similarly controls its own address translator 24". The respective call servers do not need to know about the presence of an address translator in the other network. In contrast to the arrangement in FIG. 2, the call server 16" is caused to direct data on its external virtual gateway 28' to the external gateway 26" of address translator 24". This is as much information as call server 16" needs about the destination network 4. Similarly, call server 18" is caused to direct data from its external virtual gateway 26" to the external virtual gateway 28' of address translator 24'.

The detailed (but simplified) protocol exchanges are shown in FIG. 5. Like reference numerals are used for protocol steps which are the same as those of FIG. 3. Thus the address translator 24' tells the call server 16" about the SDP information of virtual gateway 26' which "talks" to gateway 6. It also tells gateway call server 16" about the SDP information for virtual gateway 28' which is the public virtual gateway that will be reached from the other region 4.

In protocol exchange 36' call server 16" carries out a typical SIP-T exchange with call server 18" but using the SDP Information for public virtual gateway 28'. Call server 18" needs to know that the incoming call from call server 16" is from another domain. It can recognise this based on provisioning of the route from call server 16" being in another IP address space. It needs to know this so it can get its address translator 24" into the call. In protocol exchange 37, call server 2 informs address translator 24" of the public information for address translator 24'. Then in protocol exchange 38', address translator 24" provides call server 18" with information about virtual gateway 28" for passing to gateway 12 and virtual gateway 26" for passing to call server 16" to pass on to address translator 24'. Then in protocol exchange 40', call server 18" tells address translator 24" to send packets for this call to media gateway 12.

In protocol exchange 44, call server 18" provides information to call server 16" about the SDP information for public virtual gateway 26" on address translator 24". In protocol exchange 46, call server 16" provides information to the address translator 24' about the mapping which it should make between virtual gateway 24" on address translator 26" and gateway 12 and finally in protocol exchange 48, gateway 6 begins to send RTP packets to address translator 24'.

Figure 7:
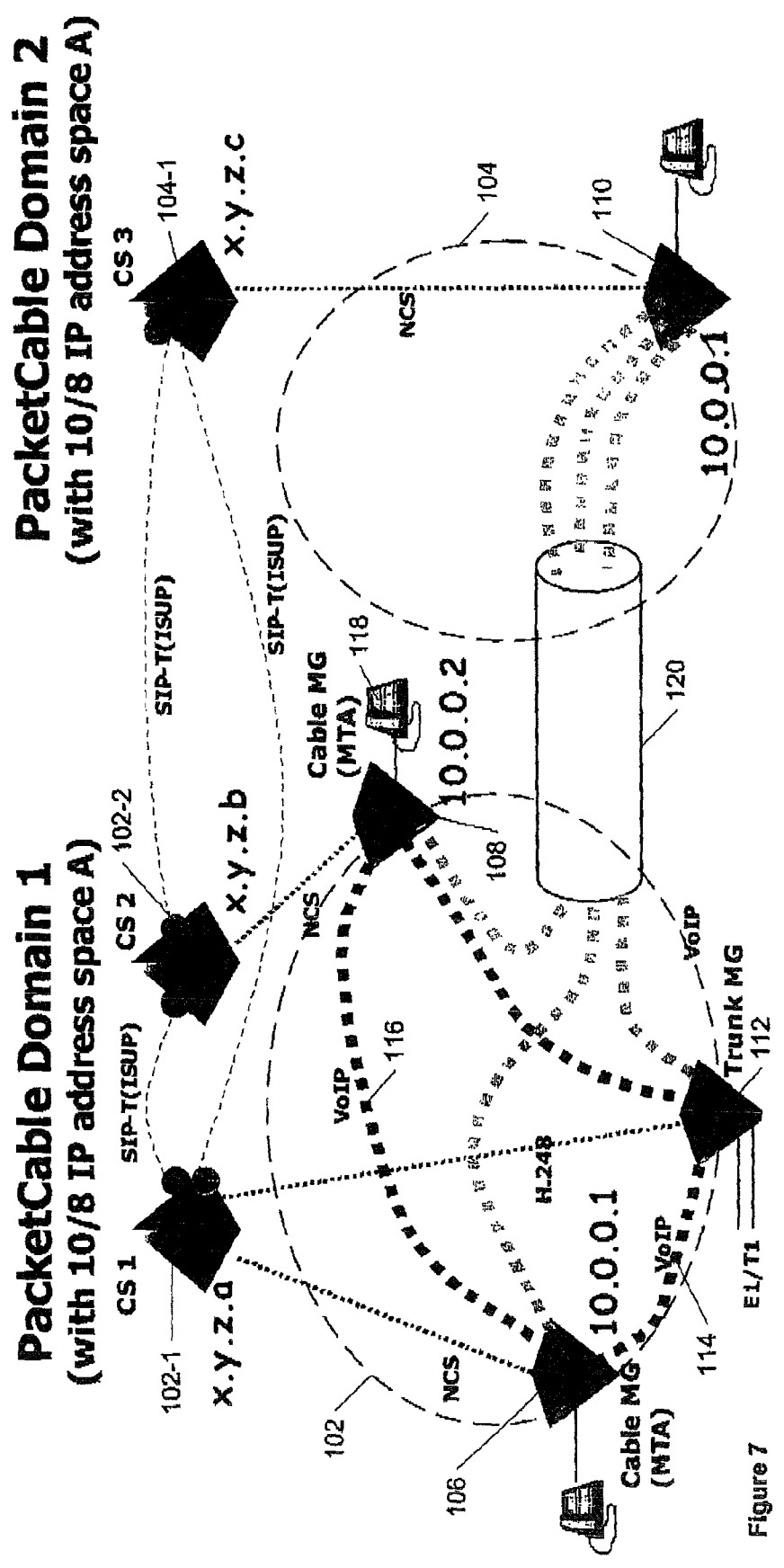

With reference to FIG. 7, a more typical scenario is shown. Two overlapping address spaces 102 and 104 have respective call servers 102-1, 102-2 and 104-1. The address spaces also have media gateways 106, 108 and 110. As will be seen, media gateways 110 and 106 both share the same IP address 10.0.0.1.

Network 102 also has a trunk media gateway 112 which provides an interface into a TDM (E1/T1) line. Thus as will be seen, some calls from media gateway 106 need only be routed within the network 102. For example a call 114 is routed to the trunk media gateway 112 and an additional call 116 is routed within the network 102 to another media gateway 108 to permit a call to be made between telephone terminals 116 and 118. None of these calls need to use the address translator 120. This is recognised by the call servers 102-1 and 102-2 because the address translator 120 is not provisioned against the SIP-T routes.

However, media gateway 110 has call set-up between the trunk media gateway 112, and the media gateways 106 and 108. All of these are recognised by call server 104-1 as requiring use of the address translator 120 because the address translator is provisioned against the SIP-T routes. Thus provisioning is used to enable a call server to decide whether or not an address translator is required.

This diagram shows a single address translator 120 between domains. This in practice, will provide a single point of failure and a potential place for overload. Thus typically, provisioning in the call servers for particular SIP-T routes will allow for provisioning of a group of address translators 120 which may then be selected according to a failover and/or load balancing algorithm such as a round robin algorithm. Failure of an address translator 120 may be detected using the device control protocol application layer heartbeat mechanisms that form part of these protocols. A failed address translator may then be made unavailable in the group.

What is claimed is:

1. A method of initiating a media call over a packet-switched network comprising:-
    (a) issuing a call set-up request at a first terminal having an address in a first address range, the call set-up request being destined for a second terminal in a separate network having an address in a second address range which overlaps with the first address range,
    (b) passing the call set-up request to a first call server communicatively coupled to the first address range,
    (c) passing the call set-up request from the first call server to a second call server communicatively coupled to the second address range,
    (d) causing the call servers to negotiate a port at each respective addresses of the terminals for subsequent communication once the call is set-up,
    (e) providing a first address translator having a first range address in the first address range,
    (f) providing a second address translator having a second range address in the second address range,
    (g) causing the first call server to provide the first terminal with the first range address of the first address translator as its destination address for the call,
    (h) causing the second call server to provide the second terminal with the second range address of the second address translator as its destination address for the call,
    (i) arranging for the first address translator to pass data received at the first range address from the first terminal at the negotiated port to the second address translator for onward communication to the address of the second terminal at the negotiated port, and
    (j) arranging for the second address translator to pass data received at the second range address from the second terminal at the negotiated port to the first address translator for onward communication to the address of the first terminal at the negotiated port,
    whereby two-way communication is established between the first and second terminals via the first and second address translators.

2. A method according to claim 1, wherein the first and second address translators are integrated in a single device having external addresses in the first and second address ranges.

3. A method according to claim 1, wherein the first and second address translators each have a third range address in a third address range which is common between the address translators, wherein the respective third range address of the second address translator is provided to the first address translator by at least one of the call servers and vice versa, and wherein data passed between the address translators is passed via their respective third range addresses.

4. A method according to claim 1, wherein the call servers each have a fourth range address in a fourth address range which is common between the call servers.

5. A method according to claim 1, wherein the first and second address ranges are IANA reserved private IP address ranges as defined in RFC 1918.

6. A first call server in a first packet-switched network comprising:-
   a terminal controller arranged to receive a call set-up request from an originating terminal in the first packet-switched network, wherein the first call server is responsive to the call set-up request to set up a communications session from the originating terminal in the first packet-switched network having a first address range to a destination terminal in a second packet-switched network having a second address range that overlaps with the first address range, the terminal controller arranged to further provide the originating terminal with a first range address of at least one address translator as its destination address for the call, the first range address being in the first address range;
   an address translator controller arranged to provide to the at least one address translator, an address of the originating terminal in the first network as derived from the call set-up request received by the terminal controller, and
   wherein the first call server is to communicate with a second call server in the second network to cause the second call server to assign a second range address of the at least one address translator as a destination address of the destination terminal, the second range address being in the second address range.

7. A first call server according to claim 6 including intra-server communication means arranged to communicate with the second call server to obtain an IP address and port for the destination terminal which is under the control of the second call server and wherein the address translator controller is further arranged to provide the IP address and port of the destination terminal to the at least one address translator.

8. A first call server according to claim 6, which arranges for the originating terminal to view a first virtual gateway in the address translator as a destination for the originating terminal, wherein the first virtual gateway has the first range address.

9. A first call server according to claim 8, which communicates with the second call server in the second packet-switched network to cause the second call server to assign a destination address of a second virtual gateway in the at least one address translator as the destination address of the destination terminal.

10. A first address translator in a first network comprising:-
   a terminal port for communicating with a first terminal in the first network, wherein the first network has a first address range, and the first network further has a first call server, and wherein the first address translator has a first range address in the first address range,
   a translator port for communicating with a second address translator in a second network having a second range address in a second address range, the second address range overlapping with the first address range and
   a control port for communicating with the first call server, the first call server being adapted to provide the first terminal with the first range address of the first address translator as its destination address for the call;
   wherein when the first address translator receives a message at the first range address from the first terminal, the first address translator routes the message to the second address translator, the second address translator having the second range address that is assigned as the destination address of a destination terminal in the second network.

11. A first address translator according to claim 10, including a controller arranged to receive at the control port, information relating to an IP address of the second address translator which is reachable via the translator port and corresponding information relating to an IP address of the first terminal and to pass data received at the terminal port from the first terminal to the first address translator via the translator port.

* * * * *